United States Patent [19]

Smith

[11] 4,172,500

[45] Oct. 30, 1979

[54] LOOSE PEANUT PICK-UP ATTACHMENT FOR A PEANUT COMBINE

[76] Inventor: Palmer L. Smith, Rte. #4, Thomasville, Ga. 31792

[21] Appl. No.: 838,145

[22] Filed: Sep. 29, 1977

[51] Int. Cl.² ...................... A01D 15/02; A01D 29/00
[52] U.S. Cl. ........................................ 171/101; 56/130
[58] Field of Search ................... 56/328 R, 364, 14.6, 56/13.5, 130; 171/101

[56] References Cited

U.S. PATENT DOCUMENTS

| | | | |
|---|---|---|---|
| 1,318,901 | 10/1919 | Myers | 171/101 |
| 1,478,142 | 12/1923 | Ortmann | 171/101 |
| 1,722,932 | 7/1929 | Mandel | 171/101 |
| 1,727,431 | 9/1929 | Herr et al. | 56/130 |
| 1,779,309 | 10/1930 | Feltman | 171/101 |
| 2,230,139 | 1/1941 | Gustin | 56/328 R |
| 2,871,643 | 2/1959 | McClellan | 56/364 |
| 2,974,467 | 3/1961 | Long | 56/128 |
| 3,053,034 | 9/1962 | Harrington et al. | 56/130 |
| 3,581,407 | 6/1971 | Ward et al. | 56/14.6 |
| 3,678,667 | 7/1972 | Long | 56/13.5 |
| 3,719,034 | 3/1973 | Lange et al. | 56/364 |
| 3,945,178 | 3/1976 | Delfosse et al. | 56/14.6 |
| 3,976,143 | 8/1976 | Rodger | 171/101 |

Primary Examiner—Louis G. Mancene
Assistant Examiner—Paul J. Hirsch
Attorney, Agent, or Firm—B. P. Fishburne, Jr.

[57] ABSTRACT

Immediately rearwardly of the peanut combine pickup head, a plowshare supported by gage wheels delivers fallen loose peanuts to an inclined conveyor having rearwardly moving paddle bars which sweep the loose peanuts rearwardly and upwardly over a rod grate through which small debris is sifted. At the rear of the conveyor and grate, the loose peanuts are delivered into a cross auger having a trough formed by additional grate bars and from this auger trough the loose peanuts and remaining lightweight debris are blown pneumatically into the combine for final cleaning and separation. Heavier debris in the auger trough is forced through a spring loaded trap door at one end of the trough by the action of the auger.

4 Claims, 8 Drawing Figures

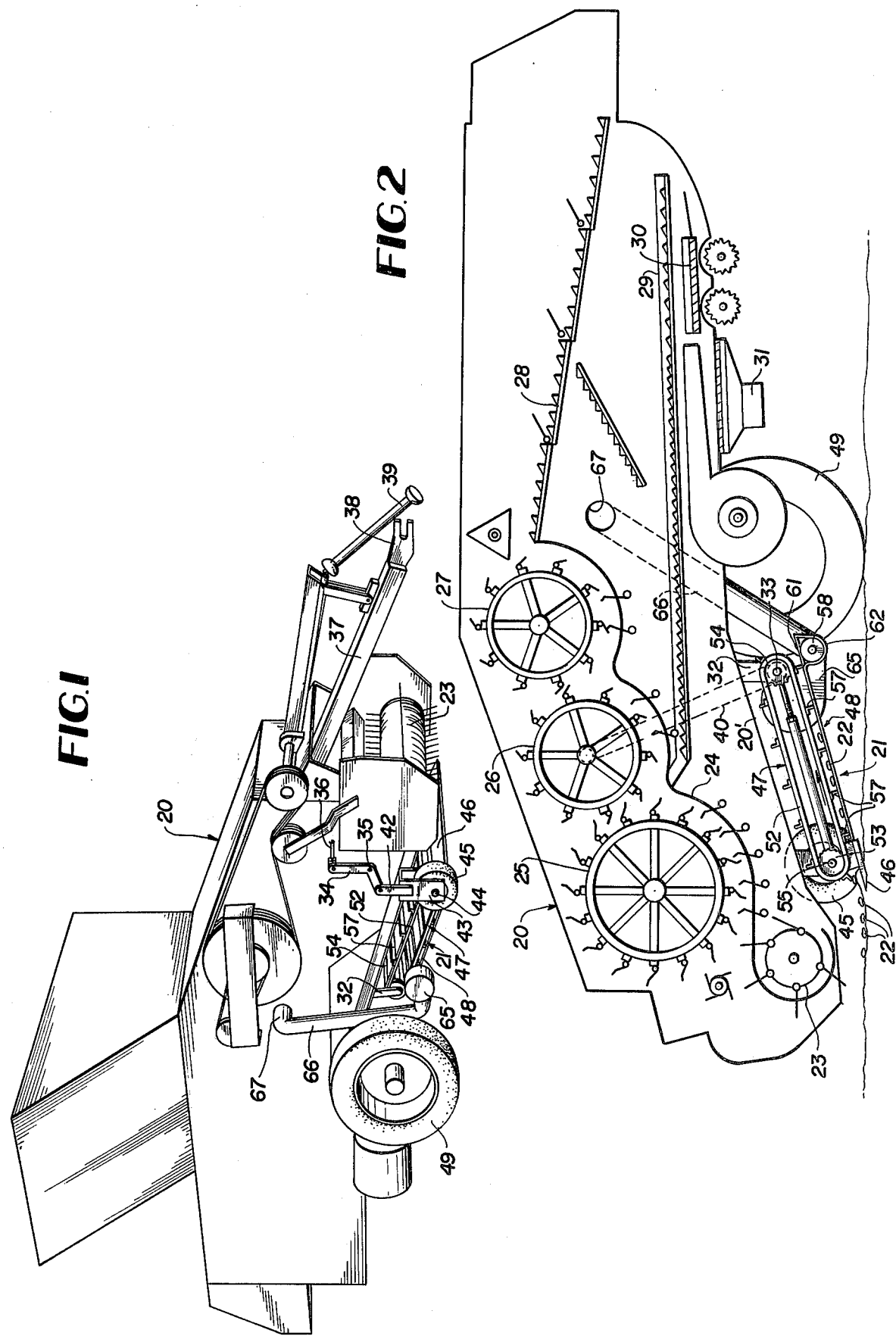

LOOSE PEANUT PICK-UP ATTACHMENT FOR A PEANUT COMBINE

BACKGROUND OF THE INVENTION

Peanut vines at the proper stage of development are dug from the ground, shaken to remove dirt from the plants, inverted and deposited in a windrow foliage down and peanuts up for a period of drying before combining. Usually two rows of plants are dug, inverted and windrowed in one operation by the harvester machine. Some of the plumpest peanuts fall loosely to the ground and are lost in the digging, inverting and windrowing operation.

After a proper period of drying, the peanut harvester, an entirely separate machine, traverses the windrowed peanut vines and picks them up and by a multi-stage cleaning process well known in the art removes the nuts from vines and debris and finally delivers the nuts to a bag or bin entirely separate from the debris and vines or stems. Additional plump peanuts are shaken loose and fall to the ground and are lost to the farmer in the combining operation. It is always the plumpest and heaviest nuts which are lost in these two stages of harvesting at a considerable economic deficit.

Accordingly, it is the objective of this invention to provide a simple, reliable and relatively inexpensive loose peanut pick-up attachment for peanut combines, which, during the combining of the windrowed vines, will recover virtually all of the fallen nuts which were lost in the previous digging and inverting operation, as well as during combining when the pick-up head of the combine causes additional nuts to drop to the ground. The invention will therefore effect the recovery of particularly choice plump nuts during its operation as a combine attachment and will more than justify its cost.

With a few minor modifications, the peanut pick-up attachment can be adapted to virtually all peanut and edible bean combines now on the market and will mean a substantial savings in peanuts and beans for the farmer in return for little additional cost in equipment.

Other features and advantages of the invention will become apparent during the course of the following description.

BRIEF DESCRIPTION OF THE DRAWINGS

FIG. 1 is a perspective view of the invention applied to a peanut combine.

FIG. 2 is a side elevational view of the invention and combine.

DETAILED DESCRIPTION

Figure 3:
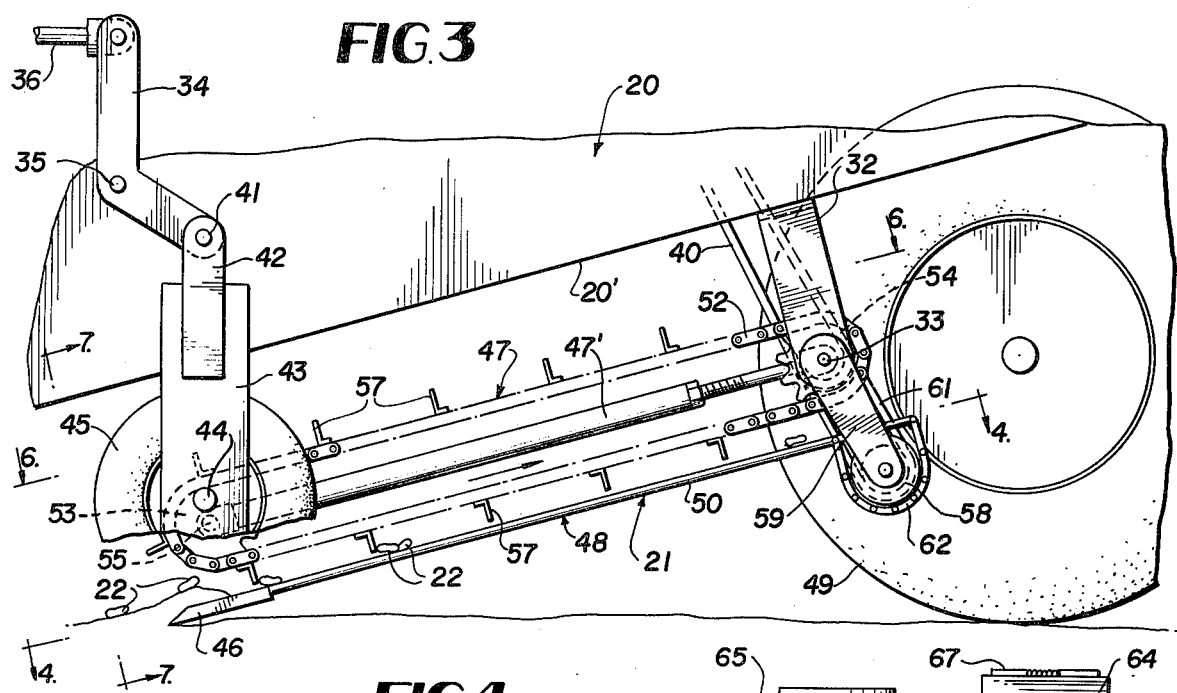
FIG. 3 is an enlarged side elevational view of the invention, partly in cross section.

Referring to the drawings in detail wherein like numerals designate like parts throughout, the numeral 20 designates conventional peanut combine such as a Long Super II Peanut Combine, Model 1351, manufactured and sold by Long Mfg. N.C., Inc., Tarboro, N.C. 27886. Such a combine subjects the peanuts to three stages of cleaning before delivering them into a bag or bin.

As previously mentioned, the invention proper shown in its entirety by the numeral 21 is an attachment or accessory for the combine 20 to pick up or recover loose peanuts 22 which have fallen on the ground during the initial digging, inverting and windrowing operation, or as a result of contact with the leading pick-up head 23 of the combine.

The details of construction and operation of the combine will be omitted except to state that the pick-up head 23 picks up the peanuts and attached foliage and debris and delivers them upwardly and rearwardly over an apron 24 above which are mounted a plurality of rotors 25, 26 and 27, FIG. 2. Rearwardly of the apron 24 and top rotor 27, the nuts are subjected at 28, 29 and 30 to first, second and third stages of cleaning before delivery through an outlet 31 to a collection bin or the like.

The invention 21, in a manner to be described, picks up the loose peanuts 22 with some soil and debris and delivers them upwardly and rearwardly in relation to a means for removing most of the debris and trash from the nuts, and, finally, the recovered nuts are delivered by the invention into one side of the combine 20 between the first and second cleaning stages so that along with the other combined nuts they may receive their final cleaning.

More particularly, the invention comprises sturdy rear mounting brackets 32 at the opposite sides thereof dependingly secured to the combine. The rear end of the assembly 21 forming the pick-up attachment is pivoted at 33 on a horizontal transverse pivot axis to the rigid brackets 32. To facilitate turning with the combine at the ends of rows and for transport, the forward end of the assembly 21 is bodily raised and lowered from the driver's seat of the tractor, not shown, which is pulling the combine 20, by an elevator lever 34 pivoted at 35 to the combine and connected at its top with a pull link 36 extending adjacent the driver of the tractor. It will be understood that the combine 20, FIG. 1, has a draft tongue 37 adapted for coupling at 38 with a drawbar on the tractor, and the tractor power takeoff means drives an input drive shaft 39 of the combine. As shown diagrammatically in FIG. 2, suitable gearing 40 coupled with a transverse shaft of one of the rotors 26 of the combine powers the invention 21 including its conveyor means, auger and peanut blower, to be described.

Figure 7:
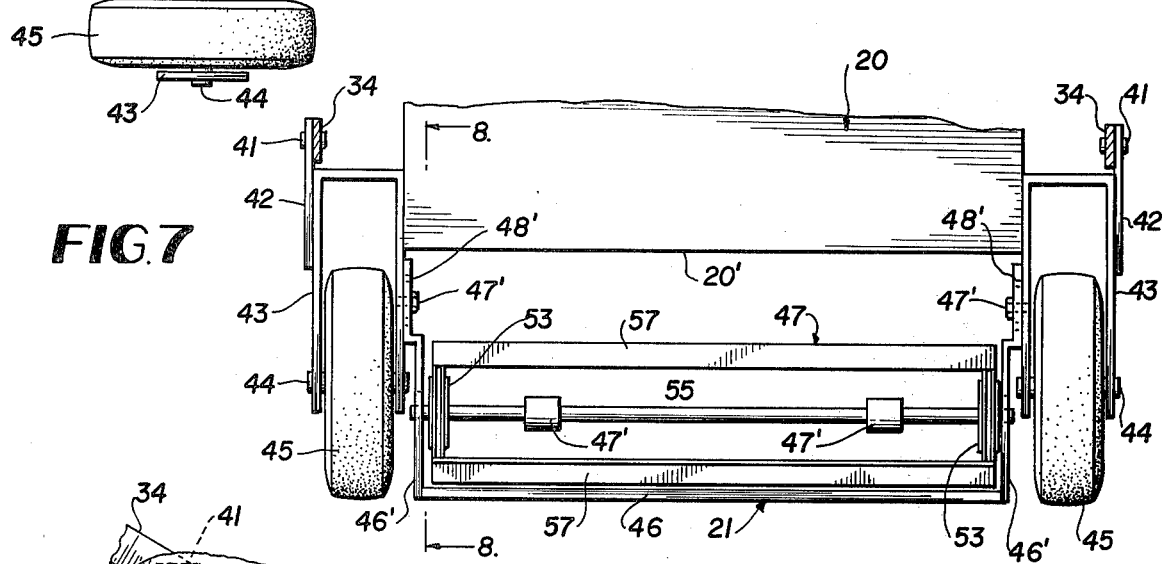
FIG. 7 is a front end elevational view of the invention taken substantially on line 7—7 of FIG. 3.

The lift lever 34 has its lower end pivotally connected at 41 with links 42 on each side of the attachment, FIG. 7, these links being rigidly attached to U-brackets 43 upon which the axles 44 of gage wheels 45 are rigidly supported.

The invention further comprises a leading straight transverse edge plowshare 46 or blade which normally penetrates about two or three inches beneath the soil, FIG. 3, as the combine travels forwardly to lift the fallen loose peanuts 22 along with a small amount of soil and debris, for the purpose of presenting the nuts and debris to a conveyor means 47 and an underlying coacting parallel rod grate 48.

The plowshare 46 at its ends is secured rigidly to upstanding support brackets 46', FIG. 7, which in turn are adjustably attached at 47' to the inner sides of the U-brackets 43. The tops of brackets 46' have multiple apertures 48' formed therein whereby the height of the plowshare 46 relative to the gage wheels 45 can be adjusted and locked. It should be understood that when the lift levers 34 are utilized during turning of the combine at the ends of rows to elevate the forward end of the nut pick-up attachment 21, the entire assembly 21 swings upwardly at its leading end and pivots around the rear end pivot axis 33. The conveyor means 47 and rod grate 48 with plowshare 46 and gage wheels 45 are raised and lowered as a unit by the levers 34 from the driver's seat of the tractor. It may also be noted that the pick-up attachment 21 is mounted just forwardly of the main combine wheels 49 and just below the inclined bottom wall 20' of the combine body.

The plowshare 46 is attached to the forward ends of multiple spaced parallel inclined longitudinal grate rods 50 which collectively constitute the previously-noted small debris and soil separating grate 48 beneath the conveyor 47. This grate is in a common plane with the plowshare 46 and is rigidly connected through the plowshare and brackets 46' and 43 with the gage wheels 45. Therefore, the gage wheels will always regulate the angle of the grate 48 and depth of penetration of the plowshare 46.

Figure 8:
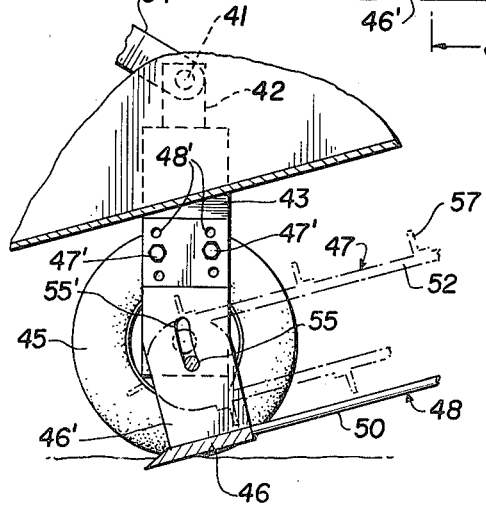
FIG. 8 is a fragmentary side elevation in cross section taken on line 8—8 of FIG. 7.

Conveyor 47 comprises a pair of laterally spaced parallel endless chains 52, trained over forward and rear sprocket gears 53 and 54. The transverse shaft supporting the rear sprocket gears 54 defines the previously-identified rear pivot axis 33 for the entire assembly 21. Front sprocket gears 53 are mounted on another transverse shaft 55 and this shaft, FIG. 8, is floatingly supported at its opposite ends in arcuate slots 55' provided in plowshare brackets 46', so that the forward end of the conveyor 47 can rise and fall somewhat relative to the grate 48 and plowshare 46. This prevents stones or other large debris from jamming between the conveyor and grate. The weight of the conveyor 47 is sufficient to enable it to move the peanuts 22 and other debris and soil rearwardly over the grate 48.

The conveyor 47 further comprises a multiplicity of equidistantly spaced parallel transverse paddle bars 57 interconnecting the two chains 52. The chains are driven at their rear ends by the gearing 40 in the direction of the arrows, their lower runs carrying the paddle bars 57 closely along the top of the grate 48 to sweep the loose peanuts 22 rearwardly and upwardly. Soil and small debris at this time will sift through the grate 48 and fall on the ground.

At the rear end of the grate 48, a horizontal transverse auger 58 is provided on the attachment 21, the ends of this auger being journaled on depending brackets 59. The auger 58 is turned by additional gearing 61, FIG. 3, powered from the gearing 40 and associated combine rotor 26. At least the curved bottom wall of an auger trough 62 is also formed of spaced parallel transverse rods to further separate debris from the peanuts 22 as they travel through the trough 62 under influence of the auger. As shown, the auger is immediately below the rear end of the grate 48. Consequently, the peanuts 22 and any debris of like size, upon reaching the top of the grate 48, will enter the transverse auger trough 62. In this connection, FIG. 4, every other grate rod 50 terminates at the forward side of the trough 62 while the alternating rods 50 extend across the top of the trough, as shown at 63. This arrangement allows the peanuts and similar size debris to enter the auger trough while larger debris moves rearwardly across the auger trough and falls to the ground. Thus, when the nuts 22 enter the auger trough, they are already to a great extent ridded of foreign matter.

Figure 4:
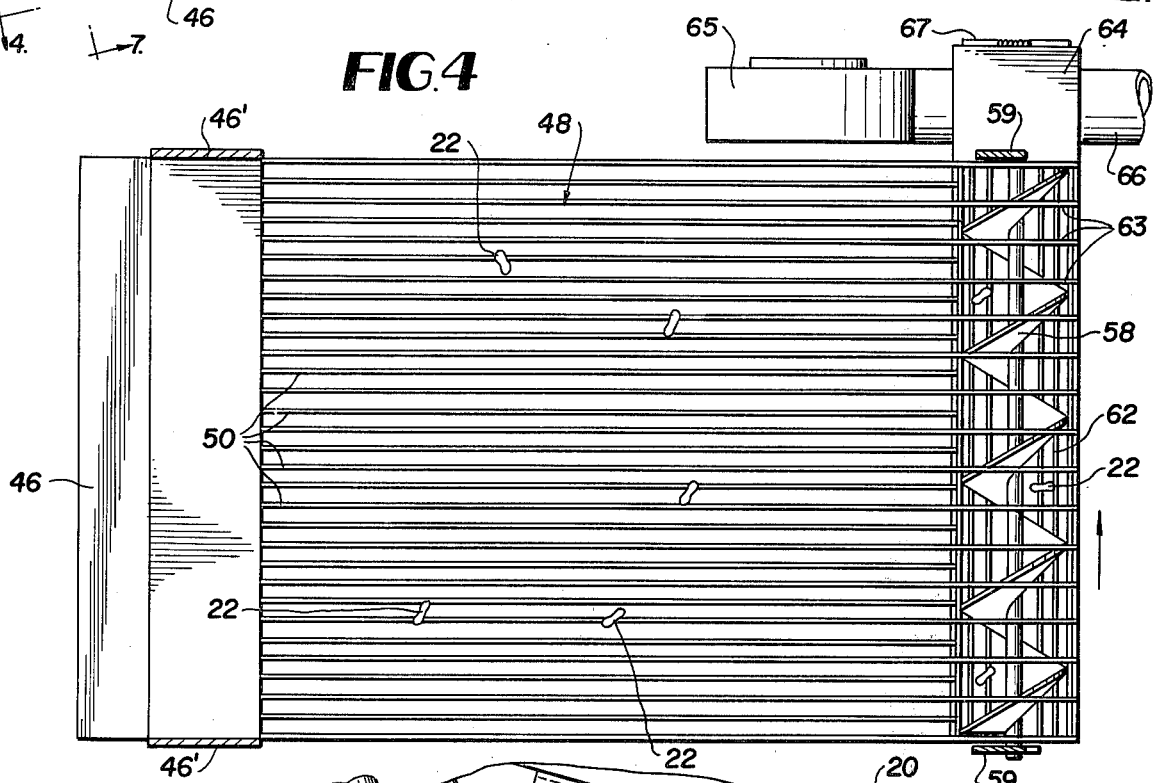
FIG. 4 is a generally horizontal cross section taken on line 4—4 of FIG. 3.
Figure 5:
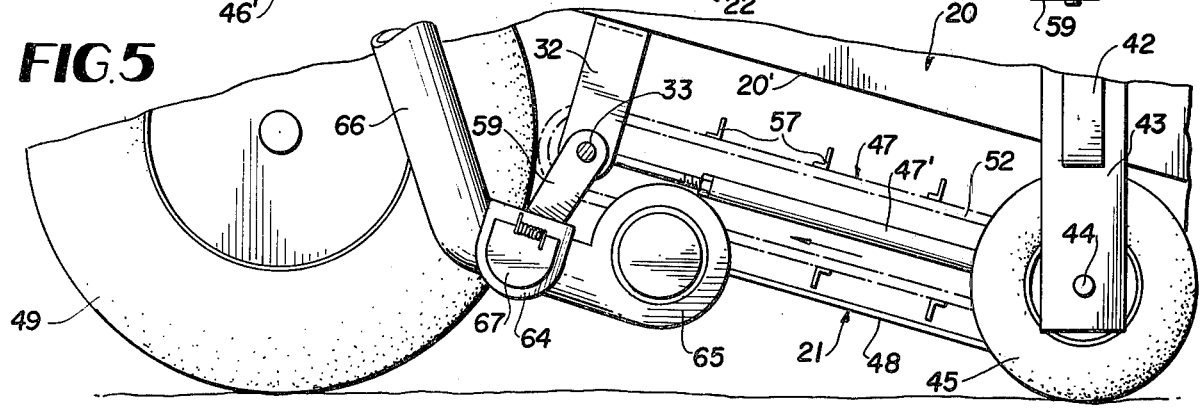
FIG. 5 is a fragmentary side elevation of the invention viewed from the opposite side thereof from that shown in FIGS. 2 and 3.
Figure 6:
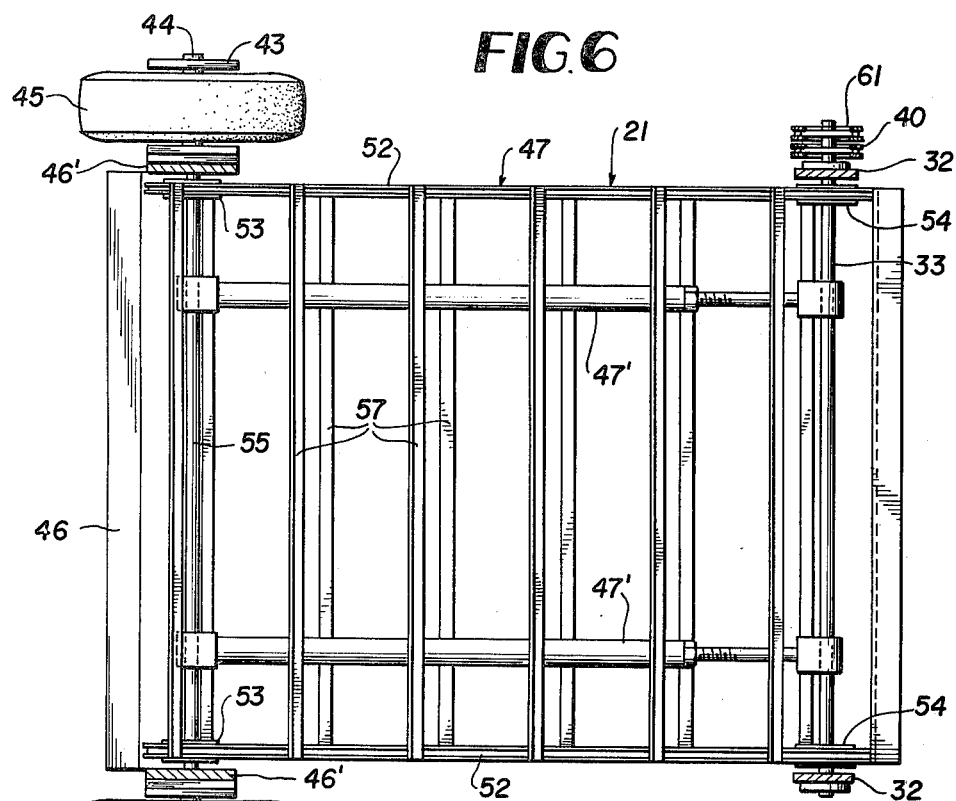
FIG. 6 is an elevational view taken substantially on line 6—6 of FIG. 3.

The auger 58 advances the peanuts and remaining debris transversely of the assembly 21 in the direction of the arrow in FIG. 4. During this movement, additional debris or trash gravitates through the rods forming the bottom of the trough 62. When the peanuts have advanced into an enclosure 64 at one end of the auger 58, they are acted on by a blast of air from a blower 65 on one side of the attachment 21, FIGS. 4 and 5, and such air blast from the blower lifts the peanuts 22 from the enclosure 64 at the end of the auger and propels them through conduit 66 leading upwardly and into one side of the combine through an elbow 67, FIG. 2, as previously mentioned, so that the peanuts and any lightweight debris still present will be processed and cleaned along with the main mass of peanuts in the combine.

It should be noted that chain conveyor means 47 is equipped with adjustable tightening means 47', as illustrated. 64 through a spring-loaded trap door 67 covering the outer end of the enclosure. Such heavy debris will simply fall to the ground.

Thus, in a continuous operation, while the conventional combine 20 separates the peanuts from the dried inverted foliage in the customary manner, the pick-up attachment 21 lifts the loose fallen peanuts from the ground and by means of the conveyor 47 moves them upwardly on the grate 48 and into the trough 62 of the auger 58. The auger then advances the peanuts across the back of the pick-up attachment to the enclosure 64 where they are acted upon by the air stream from the blower 65 and lifted through the conduit 66–67 into the body of the combine. The structure of the pick-up attachment is simple and economical and its mode of operation is efficient and reliable. Its use does not interfere in the slightest with the operation of the combine proper but adds greatly to the overall efficiency of the combine by recovering almost all of the loose fallen peanuts which are always among the best nuts, and which would be otherwise lost entirely.

The advantages of the invention should now be clear to those skilled in the art without further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a combine for peanuts and the like, a combine pick-up head for acting on windrowed inverted plants, and means carried by the combine rearwardly of said pick-up head for recovering fallen loose peanuts on the ground and delivering such peanuts into the combine for further treatment therein, said means comprising a plow blade for lifting the loose peanuts from the ground, an inclined grate attached to and extending rearwardly from the plow blade, an endless conveyor including loose peanut paddle bars traveling immediately above said grate and propelling peanuts to the rear end of the grate, a transverse peanut conveyor at the rear end of the grate receiving peanuts therefrom and delivering them toward one side of the combine, a pneumatic peanut conveyor means connected with the transverse conveyor and lifting loose peanuts therefrom and delivering them through one side of the combine into the combine for comingling with other peanuts being processed in the combine, said transverse peanut conveyor comprising an auger conveyor including a trough below the elevation of the rear upper end of said grate, and at least the bottom of said auger trough comprising an additional debris separating grate.

2. In a combine for peanuts and the like as defined in claim 1, and an extension grate at the top of said inclined grate spanning the top of said trough for separating large debris from peanuts entering the trough from the top of the inclined grate.

3. In a combine for peanuts and the like, a combine pick-up head for acting on windrowed inverted plants, and means carried by the combine rearwardly of said pick-up head for recovering fallen loose peanuts on the ground and delivering such peanuts into the combine for further treatment therein, said means comprising a plow blade for lifting the loose peanuts from the ground, an inclined grate attached to and extending rearwardly from the plow blade, an endless conveyor including loose peanut paddle bars traveling immediately above said grate and propelling peanuts to the rear end of the grate, a transverse peanut conveyor at the rear end of the grate receiving peanuts therefrom and delivering them toward one side of the combine, a pneumatic peanut conveyor means connected with the transverse conveyor and lifting loose peanuts therefrom and delivering them through one side of the combine into the combine for comingling with other peanuts being processed in the combine, and said pneumatic peanut conveyor means comprising a blower, a conduit connected with the blower and with the transverse conveyor and connected into one side of the combine, and a debris outlet door for heavy debris at one end of the transverse conveyor.

4. In a combine for peanuts and the like as defined in claim 3, and gage wheels connected with the plow blade to regulate the depth of penetration of the plow blade into soil.

* * * * *